(12) United States Patent
Temby et al.

(10) Patent No.: US 11,077,513 B2
(45) Date of Patent: Aug. 3, 2021

(54) WELD CELL SYSTEM WITH COMMUNICATION

(71) Applicant: Illinois Tool Works Inc., Glenview, IL (US)

(72) Inventors: Timothy N. Temby, Appleton, WI (US); James F. Rappl, Neenah, WI (US); Joseph E. Feldhausen, Appleton, WI (US); Todd E. Holverson, Appleton, WI (US); Michael H. Novak, Virginia Beach, VA (US); Jeffery R. Ihde, Greenville, WI (US); Joseph C. Schneider, Menasha, WI (US); Bruce P. Albrecht, Neenah, WI (US); Thomas A. Bunker, Black Creek, WI (US); Clay A. Byron, Mobile, AL (US)

(73) Assignee: ILLINOIS TOOL WORKS, Glenview, IL (US)

(*) Notice: Subject to any disclaimer, the term of this patent is extended or adjusted under 35 U.S.C. 154(b) by 182 days.

(21) Appl. No.: 16/109,124

(22) Filed: Aug. 22, 2018

(65) Prior Publication Data
US 2018/0361492 A1    Dec. 20, 2018

Related U.S. Application Data

(62) Division of application No. 13/339,288, filed on Dec. 28, 2011, now Pat. No. 10,058,948.

(60) Provisional application No. 61/427,891, filed on Dec. 29, 2010.

(51) Int. Cl.
B23K 9/095    (2006.01)
B23K 9/10     (2006.01)
B23K 9/12     (2006.01)
B23K 9/32     (2006.01)

(52) U.S. Cl.
CPC ............ *B23K 9/0953* (2013.01); *B23K 9/095* (2013.01); *B23K 9/1043* (2013.01); *B23K 9/323* (2013.01)

(58) Field of Classification Search
CPC .. B23K 9/095–0956; B23K 9/10–1062; B23K 9/12–1278
See application file for complete search history.

(56) References Cited

U.S. PATENT DOCUMENTS

| 4,423,306 A | 12/1983 | Fox |
| 4,724,301 A * | 2/1988 | Shibata ................ B23Q 35/128 219/124.34 |
| 5,637,241 A | 6/1997 | Moates |
| 6,040,555 A | 3/2000 | Tiller et al. |

(Continued)

FOREIGN PATENT DOCUMENTS

| DE | 20080011 | 12/2001 |
| JP | 9063707  | 3/1997  |

(Continued)

OTHER PUBLICATIONS

International Preliminary Report on Patentability. The International Bureau of WIPO, Geneva, Switzerland. Jul. 2, 2013.

(Continued)

*Primary Examiner* — Michael A Laflame, Jr.
(74) *Attorney, Agent, or Firm* — McAndrews, Held, Malloy, Ltd.

(57) ABSTRACT

A method and apparatus for providing welding-type power is disclosed and includes a means for communicating.

19 Claims, 2 Drawing Sheets

(56) References Cited

U.S. PATENT DOCUMENTS

| | | | | |
|---|---|---|---|---|
| 2004/0004113 | A1* | 1/2004 | Blankenship | G06K 19/07749 235/375 |
| 2004/0222204 | A1* | 11/2004 | Hutchison | B23K 9/091 219/130.21 |
| 2004/0243282 | A1* | 12/2004 | Watanabe | B25J 9/1697 700/259 |
| 2005/0279819 | A1* | 12/2005 | Stava | B23K 35/02 235/375 |
| 2006/0278621 | A1* | 12/2006 | Takahashi | B25J 19/0029 219/125.1 |
| 2007/0051711 | A1 | 3/2007 | Kachline | |
| 2008/0061049 | A1* | 3/2008 | Albrecht | B23K 9/0956 219/137 R |
| 2008/0143315 | A1* | 6/2008 | Bickel | G01R 31/088 324/76.12 |
| 2008/0149608 | A1* | 6/2008 | Albrecht | B23K 9/123 219/130.1 |
| 2008/0296278 | A1 | 12/2008 | Meckler | |
| 2009/0088907 | A1 | 4/2009 | Lewis et al. | |
| 2009/0107961 | A1 | 4/2009 | Zaffino et al. | |
| 2010/0213181 | A1* | 8/2010 | Hirota | B23K 9/0671 219/130.31 |
| 2016/0129516 | A1* | 5/2016 | Hoeger | B23K 9/1087 219/121.11 |

FOREIGN PATENT DOCUMENTS

| | | |
|---|---|---|
| JP | 2005166317 | 3/2005 |
| WO | 2011/067795 | 12/2011 |
| WO | PCT/US2011/067795 | 12/2011 |

OTHER PUBLICATIONS

First Office Action and Search Report, dated Sep. 30, 2014, China Patent Office, SIPO, 100088 Beijing, China.

* cited by examiner

WELD CELL SYSTEM WITH COMMUNICATION

RELATED APPLICATIONS

This is a divisional of, and claims the benefit of the filing date of, U.S. patent application Ser. No. 13/339,288, filed on Dec. 28, 2011, which is a continuation-in-part of, and claims the benefit of the filing date of, U.S. Patent Application No. 61/427,891 filed on Dec. 29, 2010.

FIELD OF THE INVENTION

The present invention relates generally to the art of welding-type power supplies and welding operations. More specifically, it relates to a welding-type power supply that is part of a weld cell system having the ability to communicate outside the weld location.

BACKGROUND OF THE INVENTION

There are many known welding-type systems used to provide a welding-type output or welding-type power for many known applications. Welding-type system, as used herein, includes any device capable of supplying welding, plasma cutting, and/or induction heating power including invertors, convertors, choppers, resonant power supplies, quasi-resonant power supplies, etc., as well as control circuitry and other ancillary circuitry associated therewith. Welding system, or system for welding, as used herein, includes one or more of a power source, controller, wire feeder, and a source of gas, it may also include peripherals such as robots etc. Welding-type output, as used herein, includes outputs suitable for welding, plasma or heating. Welding-type power, as used herein, refers to welding, plasma or heating power.

Welding power supplies are often part of a weld cell. Weld cell, as used herein, is the area in which the welding system resides, including the welding-type power supply, and the weld location. It can include physically separate locations, for example when lengthy weld cable are used. Weld location is defined herein as the area in which the weld occurs. Portions of the welding-type system may be at the weld location. In some applications, such as shipyards and pressure vessels, the feeder is at the weld location, while the power source is remote from the weld location.

Some known applications, such as welding in shipyards, involve multiple processes and multiple welders. A portion of the welding cell system, such as the power supply, may be located outside the ship being built, and other portions of the system, such as the wire feeder and/or torch/gun, may be located inside the ship at the weld location. There may be hundreds of cables running from outside the ship to inside the ship, each up to hundreds of feet long. It is often difficult to determine the matching ends of a cable, thus a user may run another cable from inside to outside when beginning a new weld, exacerbating the problem. Alternatively, the user can spend an inordinate amount of time finding the end of a cable inside the ship (or outside), or try and haul the heavy power supply into the ship to a location closer to the weld location.

This problem is made worse when different processes are used with different power supplies. When the welder finishes one task, the cables might not be useable for the next process, so another cable is run. Also, the welder typically needs to adjust settings on the welding power supply outside the ship, so knowing which power supply is connected to which cable is important. Some systems provide for a separate control cable, which results in another cable needing to be identified at each end.

Wireless communication from inside the ship to outside the ship can be difficult because the ship's hull often blocks RF signals. Welding pressure vessels, such as coal-fired boilers, results in many of the same problems present when welding in shipyards.

The numbers of cables and difficulty communicating can adversely impact welder productivity, repairs, distortion, lost time, quality, quality assurance, the skill level needed to weld properly, cost and complexity of cables, time and expense of locating associated power supply and working end of cables, time and expense of changing process or variables, and time for rework and repairs associated with choosing the wrong process or parameters.

Accordingly, a welding-type system that simplifies cable management for a weld cell, particularly in ships or pressure vessels, is desired. Such a system preferably provides for communication from the weld location to remote from the weld location.

SUMMARY OF THE PRESENT INVENTION

According to one aspect of the invention a welding-type system can identify a weld cable and includes a welding power supply having a controller and a power circuit that receives at least one signal from the controller, and provides power on at least one weld cable connection. A weld cable locator module has a cable locator output connected to at least one of the controller, the power circuit, and the weld cable connection.

According to a second aspect of the invention a method of locating a distal end of a weld cable having a proximal end connected to a welding-type power supply includes providing an identifying signal to the proximal end, transmitting the identifying signal to the distal end and detecting the identifying signal at the distal end.

According to a third aspect of the invention a method of locating a distal end of an output cable having a proximal end connected to a welding-type power supply includes storing in the welding-type power supply cable identifier information indicative of the cable connected to the welding-type power supply, receiving a distal end cable identifier signal, comparing the cable identifier information to the distal end cable identifier signal and providing a signal indicative of the result of the comparison.

The cable locator output is connected to, and provides an identifier signal to, the weld cable connection in one embodiment.

The weld cable locator module comprises a memory in which storing cable identifier information is stored, a receiver that receives a cable identifier signal, and a comparator to compare the stored cable identifier information and the received cable identifier signal in another embodiment. The cable locator output is responsive to the comparator.

A pendant with a cable sensor and a transmitter responsive to the cable sensor is provided in another embodiment. The cable sensor includes an RFID reader and or a bar code reader in various embodiments.

The system includes a weld cable capable of being sensed by the a cable sensor in another embodiment.

The transmitter and/or receiver are wireless in various embodiments.

A wire feeder is connected to the distal end of the weld cable, and binding modules in the welding power supply and wire feeder bind the two together and are responsive to the weld cable locator module in other embodiments.

A visual indicator is provided at the distal end in response to the identifying signal in another embodiment.

According to a fourth aspect of the invention a welding-type system located in a weld cell that can provide welding power to a weld location and can communicate information to a location outside of the weld cell, includes a controller that is connected to and controls a power circuit. An output connection is connected to the power circuit and to a proximal end of a weld cable. A weld cable communication module is connected to the output connection and to a data transmitter. Another weld cable communication module is connected to a distal end of the weld cable and is located at the weld location. A data receiver receives data transmitted by the data transmitter. The data receiver is located at a location outside of the weld cell.

According to a fifth aspect of the invention a method of communicating welding-related data from a weld location to outside a weld cell includes sensing welding-related data at the weld location, transmitting the from the weld cell, on a weld cable, to a receiver outside of the weld location, then transmitting the data to a location outside of the weld cell, and receiving the data outside of the weld cell.

The data transmitter includes a first smart grid communication module and the data receiver includes a second smart grid communication module in another embodiment.

The data transmitter and receiver are wireless in other embodiments.

The weld location weld cable communication module is in a wire feeder, pendant, smart phone, torch, or other device, in various embodiments.

The transmitter transmits data indicative of at least one of operating parameters, quality information, and safety information in various embodiments.

The weld cable communication modules are two-way in other embodiments.

Other principal features and advantages of the invention will become apparent to those skilled in the art upon review of the following drawings, the detailed description and the appended claims.

Figure 1:
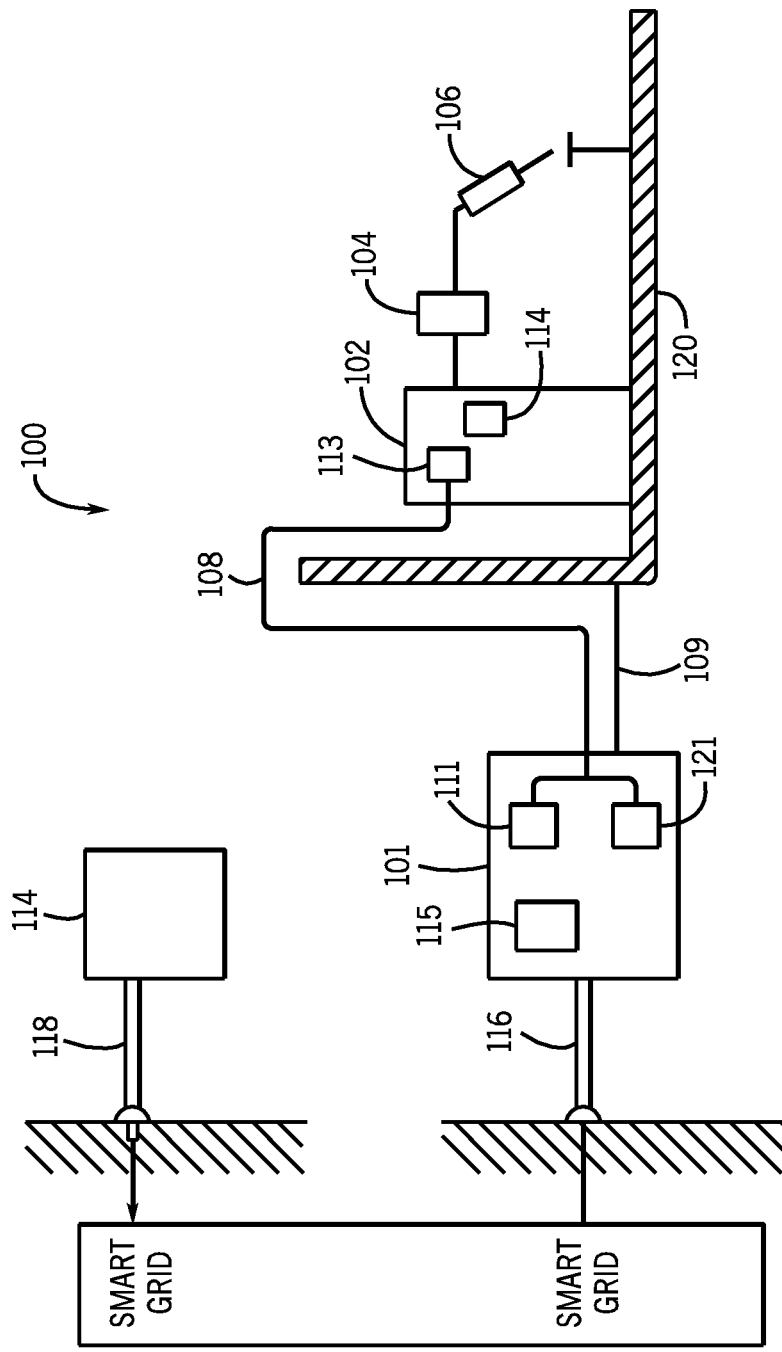
FIG. 1 is a diagram of a weld cell in accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to particular welding-type systems and weld cells, used for particular processes it should be understood at the outset that the invention can be implemented with any welding-type system where communication is desired form the weld location to another location, or within the weld location.

The preferred embodiment provides for implementing the invention with the Miller XMT 350® welding power supply. The XMT 350® is modified to have communication over the weld cables. Communication refers to transmitting or receiving process data, command data, usage data, identifying data, user feedback, user adjustment, video, biometric information, cost data, or any other information related to performing the weld. Welding power supply, as used herein, includes any device capable of supplying welding power including power circuitry, control circuitry and other ancillary circuitry associated therewith and can include multiple housings, pendants, dongles, etc.

Information that can be communicated from the weld location to a location remote from the weld location, within or out of the weld cell, includes data relating to the weld, data relating to the operator, and data for related tasks. The sensors used to gather data are preferably tied to a data collection method that will convert the data to information in a clear and intuitive format. Initially, it may dump the data to common data format like Excel®, which then can be manipulated. The conversion may be performed at the weld location or remotely.

Information relating to the weld includes arc-on time, and gun-in-hand time, weld parameters, final weld time, tack weld time, gun-in-hand time, time spent welding. Other weld information includes quality metrics such as Overall Equipment Effectiveness (OEE), Overall Process Effectiveness (OPE), weld sequence, time spent waiting, pre-heat temperature, inter-pass temperature, post temperature, and these can be automatically reported (with other issues) to management.

Information for related tasks includes time spent or on related tasks such as grinding and/or scraping for cosmetics fit up and/or spatter removal, loading parts, unloading parts, looking for parts, moving parts, waiting for parts (from another weld or for delivery), inspection of parts, reading a print, compensating (hammering, bending, prying), pre-heating, cambering, looking for parts, using a chipping hammer, wire brushing, using tempil sticks (or measuring temperature in other manners), using a needle gun and waiting, adjusting/changing ppe (personal protection equipment), entering/leaving cell, training, maintenance, fixturing, adjusting welder/machine, rework (correcting mistaken parts, gouging, re-welding, etc.), helping another cell, positioning, walking, reporting, talking, breaks, meetings, cleaning (sweeping, organizing, etc), exchanging or switching tools, changing cell layout, changing tool locations, exercising or stretching, operator safety (heat, motion, etc.), laying out parts, moving parts, and installing and removing spreader bars, and ordering parts.

Information relating to the operator includes health and safety data such as heart rate, heat stress or body temperature (core, head, etc. . . . ), movement, pinch points (i.e., hands, fingers, toes, feet, etc.), fume exposure and repetitive motion. The system may also communicate to the MRP or ERP system so the part welded is known as well as logging the operator identification or other quality and material tracking information.

The invention may also be used to provide simple, nearly automatic, point use control without additional cables. Weld cable communication is used to reduce the need for operator intervention in set-up or parameter control. The weld cable communication can be implemented using new or known technology (for example, that shown in US Patent Publications 20080116176 and 20060086706, both to Ulrich and entitled METHOD AND APPARATUS FOR REMOTELY CONTROLLING A WELDING SYSTEM, hereby incorporated by reference). The initial set-up process and adjusting one or more operating parameters (weld output parameters such wire feed speed, voltage, current, ramp rates, pulse rates, etc.) can be done remotely over the weld cables by recognizing the process accessory and consumable size. This can also be used to create orders of consumables and parts.

The information transmitted over the cable from inside the weld location to remote from the weld location can include video of the welder and/or weld, including visual, HDR (high dynamic range) image, infrared data, biometric information, torch/gun angle or orientation. A smart glove/torch can be used to collect information such as travel speed, orientation, angel, acceleration, 6-axis positional data, process selection, and can receive process information and/or work piece temperature, heat input per inch, etc., and such information can be transmitted over the weld cable to and from a controller. Alternatives include transmitting using RF, etc.

The information transmitted out of the weld location can be sent via a network, RF, etc. to operators, supervisors, service providers, suppliers (wires, gas, etc.), equipment manufactures, distributers, quality assurance departments. Operators can receive information when welding is robotic, so they can monitor multiple locations. Supervisors can monitor multiple welders. Service providers can be notified in advance or when a problem occurs. Suppliers can be notified before or when supplies are needed. QA departments can provide immediate notice of an improper weld, so corrective action can be taken more quickly.

The communicating of a feeder or user identification over the weld cable allows the feeder or user to self address to a power supply and the power supply recognize the feeder or operator. The power supply can set appropriate power and controls based on the identification if a database of users and procedures is available. This allows any operator to pick any of a number of weld cables on the deck and weld at pre-approved and qualified procedures. Thus, Weld Cable Communication (WCC) technology allows the operator to have full process control at the feeder, without additional cables. After the identification of the feeder and the power supply the feeder and power supply are uniquely bound to one another. Preferably the binding will be held until a special process implemented to separate the bound pair, which can be manual or automatic when either the feeder or the power source binds with another. Binding a wire feeder to the welding-type power supply, as used herein, is linking them together such that the welding-type power supply will work only with and/or provide the power called for by the wire feeder.

Equipment at the weld location can be, in alternatives, pendants, remote control devices, a plasma cutter, plasma control, stick control, tig control. Such equipment can be identified and/or communicate as describe herein with respect to a wire feeder.

WCC technology can remove the need for operator intervention in set-up or parameter control. WCC can enable a weld location with point-of-use control and smart components that automatically set the appropriate welding parameters. These smart components could include a stick stinger with an embedded electronic finger print, such that the power source would recognize it, and set the system to stick welding mode. In addition, smart filler metal tags could be incorporated so that the feeder and/or power source are able to recognize the filler metal, and automatically set the appropriate parameters. In addition, an employee card reader could be implemented such that an employee would only have access to the weld processes they are qualified.

Benefits or uses of WCC as described herein include locating equipment, identifying the user, identifying the equipment, identifying the wire/gas, applying user defined limits, applying system defined limits, applying security lockouts, remote diagnostics, notifying when the wire feeder or power source is malfunctioning, reducing the skill level needed to weld, providing weld info to a helmet (via RF, blue tooth, etc.), providing point of use control, theft prevention, inventory tracking, SPC, information management, factory floor communication, smart accessories, eliminating cords, providing insight to the process, skill level, etc.

The welding-type system described herein can support one or more of FCAW, GMAW, SMAW, GTAW, PAC, and CAG through the use of WCC technology that always provides point of use control without additional cables. All of the devices would operate on the secondary cable from the power source and the appropriate shielding gas/compressed air required. Control cables can be avoided.

Lead or cable locating can be done by a user connecting a transmitter to one lead (+ or −), and turning on a transmitter to start the transmission beacon. A pendant in communication with the transmitter will lead the user to the return lead. A display or audible signal (located at the lead) can guide the user. Another alternative is electronic coding of cables and hoses or visual light at end of cable. Leads can have a serial no. with an electronic means (bar or matrix code, RFID, etc.) to detect and read. Leads and gas lines can be color coded. Preferably, the locating device can be used to aide in binding a feeder/equipment to a power source. Polarity detection and/or polarity rejection, performed while locating or after locating, can avoid using the wrong polarity, such as for TIG, or avoid the wrong balance between positive and negative, such as for ac TIG.

Alternative forms of communication from the weld location to remote from the weld location include RF, WCC, communication cable, device net, ethernet, blue tooth, serial cable, WIFI, and zigbee.

Remote control of a welding-type system can include a wireless dongle the user attaches to the machine they will be using. Repeaters can be used help get through or around RF obstacles. Another alternative is a removable wireless faceplate.

Automatic set up can include stinger/torch can auto detection of consumables and setting up machine with a canned/preloaded setup provides precise operating parameters, or a range of parameters with the user making fine adjustments. Local control of the arc can be done with a hand-held meter having a couple leads you can connect to the arc. Hand-holds can provide a desired arc voltage using an outer control loop with arc voltage feedback. Prior art handheld wireless modules may be modified to include additional inputs used for control, such as for voltage leads.

RFID can be used on wire, the part, gas and operator. The system can be set up such that a welder can't weld with the wrong gas or wire, or inexperienced operators can't do certain jobs. The system can Poka-Yoke the weld location, provide information to management, and/or create a born on date with all pertinent data recorded for each weld. RFID can link wire to joint and weld procedure.

The invention can reduce the number of cables, provide operator feedback to helmet, provide managerial data, and lockout wrong wire/operator.

Alternatives include WCC, Hectronics, Bluetooth, RFID or Bar or Matrix Code, or any other communication method that has sufficient bandwidth. Bar code, as used herein, includes matrix codes.

The power profile for a process (such as flux core power, etc.) can be in the feeder—i.e., the feeder provides process control, and the weld cable from the source to the feeder acts as a bus, grid, or a "dumb" supply of power. Any of the above aspects can be combined with a remote, with polarity reversal (commutated, relay w/isolated terminals), with stick/Big/Mig, with a USB flash drive, an SD card, or other removable storage, for operator ID, with a four button set up the user can set up each process. Using one hot stud, and the other dead allows for auto-changeover for the operator between −/+/or AC to DC. A sleep mode can be made available on the feeder or power source.

Referring now to FIG. 1, a welding cell 100 that implements the invention is used to weld on a ship, vessel, or other structure 120. Welding cell 100 is located partially inside vessel 120, and partially outside vessel 120. The portion of weld cell 100 inside vessel 120 is at the weld location and includes a wire feeder 102, a pendant 104 and a torch 106. Pendant, as used herein, refers to a device that can control or provide data to or from a welding process. It can be located at the welding location, or away from the welding location. Torch, as used herein, can include a hand-held or robotic welding torch, gun, or other device used to create the welding arc.

An output weld cable 108 (which may include multiple cables) connects wire feeder 102 to a welding power supply 101. Output cable, as used herein, refers to a cable on which the output of the power supply is provided, such as a weld cable, plasma arc cable, or induction heating cable.

Welding power supply 101 is located outside of vessel 120, away from the weld location. A weld/ground cable 109 connects welding power supply 101 to the vessel (other ground arrangements may be used). Welding power supply 101 and wire feeder 102 may be based on prior art components and include a controller. Controller, as used herein, includes one or more circuits (analog or digital) that are used to control all or part of a welding-type power supply or system. A controller can be located in one or more locations, and on one or more circuit boards, and in one or more modules. However, wire feeder 102 and power supply 101 preferably include or (for systems based on prior art) are modified to include features that allow this invention to be implemented. In practice, a weld site might have many wire feeders, many welding power supplies, and many cables running between the power supplies and the wire feeders. The present invention helps connect the proper combination of power supply, weld cable, and wire feeder.

Wire feeder 102 preferably includes a weld cable communication module 113 and a sensor module 114 that cooperate to locate the correct weld cable, bind welding power supply 101 and wire feeder 102 to one another, and provide for communicating information on cable 108 between welding power supply 101 and wire feeder 102. Weld cable communication module 113 can be a one or two-way weld cable communication module, and is connected to cable 108 to allow for the information to be communicated. Sensor module 114 senses the cable and provides a cable locator output. Weld cable communication module is a module that provides for communication over a weld cable. Module, as used herein, is a circuit or circuits and/or software and hardware that cooperate to perform a function.

Welding power supply 101 preferably includes a power circuit connected to an output connection, a power supply weld cable communication module 111 connected to the output or weld cable connection (where the lines form 11 and 121 join) and a cable locator module 121. Weld cable communication module 111 can be a one or two-way weld cable communication module, and is connected to the output connection, as is the proximal end of cable 108 to allow for information to be communicated over cable 108. Cable locator module 121 is also connected to provide a cable locator output to cable 108, and transmits a signal over cable 108 to allow the end of cable 108 at the weld location to be identified by a user at the weld location. Power supply weld cable communication module is a module located in or with a power supply that provides for communication over a weld cable. Weld cable locator module is a module that allows the user to locate and identify a weld cable. Power circuit, as used herein, refers to the components that process and provide output power.

Welding power supply 101 preferably includes a smart grid communication module or data transmitter 115 that transmits data out of the weld cell to a remote location. One embodiment provides that the data is transmitted by smart grid communication module or data transmitter 115 over a power cord 116 to a smart grid. The data is then received form the smart grid by a data receiver 119 via a power cord 118 at a location remote from the weld cell. Smart grid communication module is a module that provides for communication over a power grid.

Figure 2:
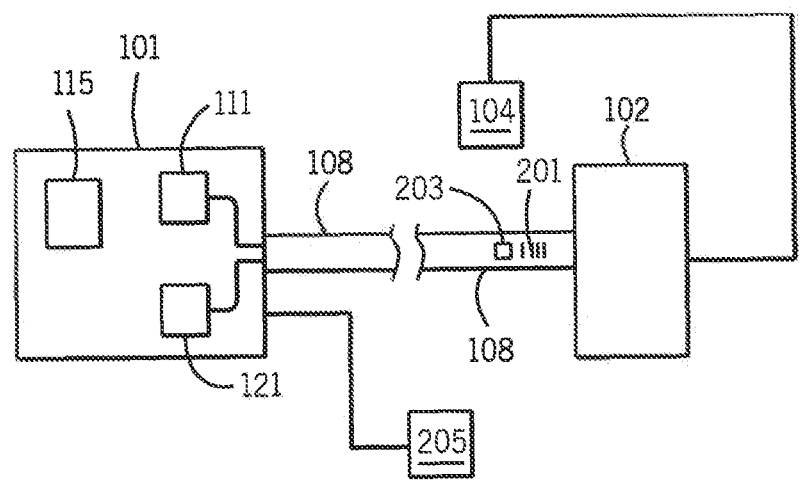
FIG. 2 is a diagram showing components used for weld cable identification in accordance with the preferred embodiment.

Referring now to FIG. 2, components used to implement cable identification are shown. Pendant 104, attached to wire feeder 102, includes a cable sensor that can be a bar or matrix code reader, RFID (or other smart code) reader, or other ID reader. Cable sensor, as used herein, refers to a sensor that can detect a cable identifier signal. If bar or matrix codes are being used, pendant 104 reads a bar or matrix code 201 on cable 108. Alternatively, the reader can be located on a smart phone, with a wireless (blue tooth, e.g.) connection to wire feeder 102, a portable reader (that can be used at either end of cable 108) or internal sensor 114 can be used. If an RFID system is used, pendant 104 reads an RFID tag 203 on cable 108. In either case, the tag or bar code is located on the end of the cable at the weld location. This allows the system to identify the cable at the weld location. Other cable identifier information, such as alphanumeric IDs, codes, etc. may be used instead of RFID tags or bar codes. Cable identifier information, as used herein, refers to information that uniquely identifies a cable (or a pair of cables).

Welding power supply 101 includes a dongle 205 having a cable locator module 205 used to identify the end of the cable near power supply 101. Alternatively, internal cable locator module 121 can be used.

Weld cable identification modules 121, 205 and 104 sense the cable identifier information, and provide a cable identifier signal to a comparator (in one of modules 121, 205 and 104) that compares it to a reference stored in a memory (such as a user input based on the end of the cable connected to welding power supply 101, or a code from the opposite end of cable 108 read by a smart phone or a portable reader). Cable identifier signal, as used herein, refers to a signal that uniquely identifies a cable (or a pair of cables).

One embodiment provides that module 205 or 121 provide an identifying signal via the cable connection to the proximal end (near welding power supply 101) of cable 108. It is transmitted via cable 108 to the distal end of cable 108 (near wire feeder 102), where it is a distal end cable identifier signal. Distal end cable identifier signal is a signal that uniquely identifies a distal end of a cable (or a pair of cables). The identifying signal can be detected or read at the distal end by the user or by one of modules 104 or 114, thus identifying the weld cable. Identifying signal, as used herein, is a signal that uniquely identifies a distal end of a cable (or a pair of cables).

Figure 3:
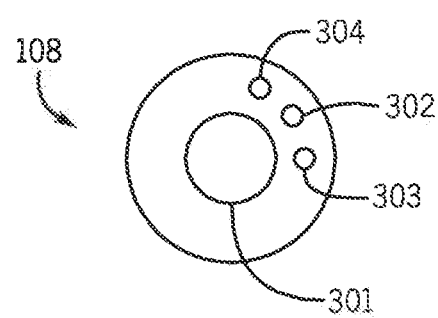
FIG. 3 is an end view of a cable in accordance with the preferred embodiment.

Referring to FIG. 3, an end view of a cable with features to make identification easier is shown. Cable 108 includes a prior art power conductor 301, and lights, LED or fiber optics strands 302-304 (depending on the number of cables desired to be uniquely identified, more LEDs can be used). Cable locator module 205 or 121 provides a cable locator output to cable 108 that lights up a known unique combination of the LEDs 302-304. The user then inspects cable ends at the weld location, looking for that unique combination. Color and pulsing combinations can also be used.

Once the ends of the cable are identified, the system can be used with wire feeder 102 connected to the proper power supply 101. The connection can be as described immediately above, where the user visually inspects for the proper cable. In this embodiment the user sets the program at welding power supply 101, and if necessary connects a cable 108 to the welding power supply (it may already be connected). Then the user visually inspects and visually inspects cables at the weld location, looking for a visual indicator of the correct cable. Visual indicator, as used herein, is an indicator that can be seen and understood by a welding operator.

When the end of the cable connected to welding power supply 101 is found, that is connected to wire feeder 102. Alternatively, if a reader is used, such as in pendant 104 or on a cell phone, the user, instead of visually inspecting cable ends at the weld location the weld cable are sensed, and identification made when the correct code or tag is sensed. This requires the user to input the correct code or tag, and may be done by reading it from the end of cable 108 near welding power supply 101. Alternatively, the reader senses the identifying information at the distal end and transmits a distal end cable identifier signal in response to the sensing. The distal end cable identifier signal can be received by wire feeder 102 or power supply 101 (or a controller of either).

The identification can also be used to bind components as discussed above. One embodiment provides for using WCC to allow the user to control welding power supply 101 from the weld location. In this embodiment the user sends process related data, such as process type, output parameters, etc., from the weld location via WCC module 113 over cable 108 to WCC module 111. Welding power supply 101 then uses that data to control the power it outputs on weld cable 108. This can also be used to bind power supply 101 to wire feeder 102 (until a new binding is made). A power supply binding module can be part of weld cable locator module 121. Power supply binding module is a binding module that resides in or with a power supply. A wire feeder binding module can be part of module 113. Wire feeder binding module is a biding module located in or with a wire feeder. Binding module, as used herein, is a module that binds two devices such that they work with one another and/or do not work with other devices.

Various alternatives provide that welding-type system 100 includes network communication, such as WAN, LAN, over power lines, over a smart grid, and that the data transmitted and/or stored, such as on a usb drive, include arc parameters and primary information, such as harmonics data, utilization data, etc. The information can be shared over the network or using a drive with end users, power companies, manufacturers that use welders, manufactures that supply welders, etc. Additionally, various alternatives and arrangements are shown in the attached appendix.

Sensor 114, in one embodiment, is able to sense welding-related data such as data indicative of at least one of operating parameters, quality information, and safety information. The sensed data is then provided from the weld location via WCC module 113 over cable 108 to WCC module 111 (which includes a weld cable data receiver) in welding power supply 101. It can be further provided by data transmitter 115 and power cord 116 to a smart grid and to data receiver 119 (via a power cord 118) to location outside of the weld cell. Alternatives provide for wireless signal, ether net transmission or other transmissions sent by transmitter 115 (which could be a wireless transmitter) and received by receiver 119 (which could be a wireless receiver) to a location outside of the weld cell. Welding-related data, refers to data indicative of the welding process, including output parameters and operator data. Weld cable data receiver is a receiver that an receive data over a weld cable. A data receiver is a circuit that can receive data. A data transmitter is a circuit that can transmit data.

Numerous modifications may be made to the present invention which still fall within the intended scope hereof. Thus, it should be apparent that there has been provided in accordance with the present invention a method and apparatus for a welding-type system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method of locating a distal end of a weld cable having a proximal end connected to a welding-type power supply, the method comprising:
   receiving an identifying signal at the proximal end of the weld cable that is connected to the welding-type power supply, the weld cable configured to conduct electrical power that is output by the welding-type power supply from the proximal end of the weld cable to the distal end of the weld cable;
   transmitting the identifying signal through the weld cable to the distal end of the weld cable;
   detecting the identifying signal at the distal end of the weld cable via an output device of the weld cable; and
   providing a visual output via the output device of the weld cable in response to the identifying signal.

2. The method of claim 1, wherein the output device comprises an electrical light.

3. A method of locating a first distal end of a first cable having a proximal end connected to a welding-type power supply, the method comprising:
   reading, via a first reader, a first cable identifier off the proximal end of the first cable connected to the welding-type power supply;
   storing, in the welding-type power supply, the first cable identifier;
   receiving, at the welding-type power supply, a second cable identifier;
   comparing the first cable identifier to the second cable identifier; and providing a signal indicative of the result of the comparison.

4. The method of claim 3, further comprising:
reading, via a second reader, the second cable identifier off the first distal end of the first cable or a second distal end of a second cable; and
transmitting the second cable identifier to the welding-type power supply.

5. The method of claim 4, wherein reading the first cable identifier comprises reading a first RFID tag or a first bar code on the proximal end of the first cable, and reading the second cable identifier comprises reading a second RFID tag or a second bar code on the first distal end of the first cable or the second distal end of the second cable.

6. The method of claim 4, wherein the second reader comprises a pendant or smartphone.

7. The method of claim 4 wherein transmitting includes transmitting a wireless signal and receiving includes receiving a wireless signal.

8. The method of claim 3 further comprising binding a wire feeder to the welding-type power supply in response to the signal indicative of the result of the comparison.

9. The method of claim 8, wherein a binding module of the welding-type power supply or wire feeder binds the wire feeder to the welding-type power supply.

10. The method of claim 8, wherein a first binding module of the welding-type power supply and a second binding module of the wire feeder binds the wire feeder to the welding-type power supply.

11. The method of claim 3, wherein the second cable identifier is received via user input.

12. The method of claim 1, wherein the output device comprises a plurality of lights.

13. The method of claim 1, wherein the output device comprises a fiber optic strand.

14. The method of claim 1, wherein the output device comprises a plurality of fiber optic strands.

15. The method of claim 1, wherein the output device comprises a light emitting diode (LED).

16. The method of claim 1, wherein the output device comprises a plurality of LEDs.

17. The method of claim 16, wherein the visual output comprises illumination of some or all of the plurality of LEDS.

18. The method of claim 1, wherein the visual output comprises an emission of light pulses.

19. The method of claim 1, wherein the visual output comprises an emission of colored light.

* * * * *